United States Patent Office 3,399,248
Patented Aug. 27, 1968

3,399,248
REACTION OF AMINO-ESTER MODIFIED VINYL POLYMER AND EPOXIDE RESINS TO FORM AN ADHESIVE COMPOSITION
Leon E. Wolinski, Buffalo, N.Y., assignor to E. I. du Pont de Nemours and Company, Wilmington, Del., a corporation of Delaware
No Drawing. Filed Dec. 1, 1964, Ser. No. 415,200
9 Claims. (Cl. 260—837)

ABSTRACT OF THE DISCLOSURE

Adhesive compositions may be prepared from amino ester modified vinyl polymers and epoxide resins by prereacting part of the amino ester modified vinyl polymer with all of the epoxide compound and blending the resulting polymer with the remainder of the vinyl polymer. This pre-reaction is effected by mixing these components for at least 6 hrs. at a temperature of at least 50° C.

In an example, 101 pts. of the diglycidyl ether of resorcinol and 8.4 pts. of an amino ester vinyl polymer (9% butyl acrylate, 45.7% butyl methacrylate, 35.3% methylmethacrylate and 10% methacrylic acid post-reacted with propylenimine were heated under reflux for 2.4 hrs. This product was then mixed with 665.6 pts. of the same amino ester modified vinyl polymer, pigments and solvents.

---

This invention relates to a process for preparing adhesives for laminating films to substrates, to adhesives prepared from the process, and to laminates using the adhesive. More specifically, it relates to a process for preparing amino ester modified vinyl polymer/epoxy adhesives, to such adhesives prepared by the process and to laminates containing them.

Useful amino ester modified vinyl polymer/aromatic epoxy adhesives for laminating films to substrates have been described in applicant's assignee's copending application Ser. No. 218,102, filed Aug. 20, 1962. These adhesives contain an aromatic epoxy component derived from a low molecular weight epoxide compound having no more than about 5 epoxy groups. Such epoxides are, in general, skin irritants which cause dermatitis and allergic reactions. Even when all direct contact with such adhesives is avoided, workers using them may be exposed to vapors of the volatile epoxy compounds as a result of the high temperatures employed in some laminating operations. In addition many laminates, for example, laminated polyvinyl fluoride film, are shaped after their preparation into three dimensional structures such as hub caps, wheel covers, etc., by bending, stamping, and so forth. Such shaped structures are often subjected in use to extreme conditions of exposure to light, water and other agents which tend to degrade the adhesive bond.

It is, therefore, an object of this invention to provide an amino ester modified vinyl polymer/epoxy adhesive, and a process for its preparation, in which the epoxy component is of low volatility. It is a further object to provide such adhesives having improved formability with laminates, and improved resistance to adverse weather conditions. It is still another object to provide laminates containing the adhesives of this invention. These and other objects will become apparent hereinafter.

The objects of this invention are accomplished by the process of preparing a composition comprising 5 to 97 parts by weight ($W_v$) of an amino ester modified vinyl polymer and 3 to 95 parts by weight ($W_e$) of an epoxy compound in which ($W_a + W_v$) equals 100 parts, which comprises:

(a) Mixing for at least six hours and at a temperature of at least 50° C., $W_e$ parts of said epoxy compound with $Y$ parts of said vinyl polymer, $Y$ being less than $W_v$, and being chosen such that the value $$\frac{W_e E_h}{E_e Y}$$

lies between about 1 and 20, wherein $E_h$ is the amino hydrogen equivalent of said vinyl polymer and $E_e$ is the epoxide equivalent of said epoxy compound, and (b) Subsequently mixing the product of step (a) with $W_v - Y$ parts of said vinyl polymer.

The term "amino hydrogen equivalent of said vinyl polymer" is defined as the weight, in grams, of the polymer containing one gram-equivalent of amino hydrogen.

The term "epoxide equivalent of said epoxy compound" is defined as the weight, in grams, of the compound containing one gram-equivalent of epoxide oxygen.

The amino ester modified vinyl polymer used in the process of this invention is defined as a vinyl polymer having attached to the carbon-carbon chain monovalent groups of the formula

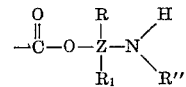

wherein Z is an aliphatic hydrocarbon radical of 2 to 3 carbon atoms; R is hydrogen or alkyl groups of 1 to 8 carbon atoms; R' is hydrogen, hydroxyl, or alkyl groups of 1 to 8 carbon atoms; and R" is hydrogen, non-tertiary alkyl groups of 1 to 8 carbon atoms, or omega-hydroxy substituted non-tertiary alkyl groups of 1 to 8 carbon atoms; the amino nitrogen content of said vinyl polymer being at least 0.01% preferably 0.1 to 8.0% based on the weight of the vinyl polymer.

A preferred variety of amino ester modified vinyl polymers are acrylic resins comprising acrylate or methacrylate esters derived from lower aliphatic alcohols having 1–8 carbon atoms having one of the following primary-amino-substituted ester groups:

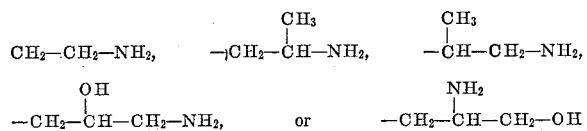

The epoxy compound used in the process of the invention is defined as a compound having 2–5 epoxy groups and is preferably a polyglycidyl ether of a dihydric phenolic compound having an epoxide equivalent of from 100 to 3000, preferably from 100 to 1000. The most preferred epoxy compound is the diglycidyl ether of resorcinol. Examples of epoxy compounds used in the process include the di- and triglycidyl ethers of glycerin, the tetraglycidyl ether of pentaerythritol, vinylcyclohexene diepoxide, diglycidyl succinate, diglycidyl phthalate, glycidyl glycidate, the glycidyl ester of epoxidized oleic acid, esters of epoxidized linoleic acid, triglycidyl citrate, the glycidyl ether of glycidyl glycolate, the diglycidyl ether of propylene glycol, and many others. The epoxy compounds include aliphatic, alicyclic and aromatic epoxides and combinations of them. They include hydrocarbon, ether and ester groups within them and may bear additional hydroxy and ester groups. The precise structure of the epoxy compound is not critical to the invention, so long as there are from 2 through 5 epoxy groups in the molecule.

The ratio $W_e E_h / E_e Y$ is of critical importance in the process of this invention, for only when the ratio is below about 20, is the volatility of the epoxy component materially decreased. The ratio $W_e / E_e$ is directly proportional to the number of epoxy functional groups in $W_e$ parts of the epoxy compound, while the ratio $Y/E_h$ is directly proportional to the number of amino hydrogens in $Y$ parts of the vinyl polymer. Thus the ratio $W_eE_h/E_eY$ is the ratio of the number of epoxy groups to the number of amino hydrogens. The preferred range of the ratio $W_eE_h/E_eY$ is between about 5 to about 15. The reaction occurring in step (a) of the process of this invention is believed to be the reaction of epoxy groups with nitrogen-hydrogen linkages, thus the ratio of those two functional groups is of importance in obtaining products of step (a) having low volatility and enhanced degradattion-resistance. Since step (b) consists of adding additional vinyl polymer components, the properties obtained in the products of step (a) are carried over to the final product.

Although the process of this invention can be carried out in the absence of any solvent, the stability of the resulting adhesive is low, necessitating use of the adhesive in lamination processes within a short time. It is thus preferred to carry out both steps (a) and (b) in an organic solvent medium, for when a solvent is used, the adhesives may be stored in it until use is desired. The solvent also provides a method for easily mixing the components, and additionally, provides a ready-made solution which may be spread directly on the laminate components.

Because of its low cost, high volatility, and good solvent power, the preferred solvent is a mixture of isopropyl alcohol and toluene in the ratio by weight of about 30 to 70; however, the nature of the solvent is not critical. Other suitable solvents which can be used, either individually or in mixtures, include the common commercially available alcohols, esters, ketones, aromatic hydrocarbons and halogenated hydrocarbons which have a boiling point of less than about 175° C. For example, methyl, ethyl, n-propyl, n-butyl alcohols; methyl, ethyl, propyl, and butyl acetates and propionates; acetone, methyethyl and diethyl ketones; benzene and the xylenes; and, ethylene chloride, chloroform and carbon tetrachloride, may be employed.

The temperature of step (a) of the novel process may range between 50° C. to about 175° C., preferable, for convenience, it will be reflex temperature. For step (b) the temperature is not critical.

Pressure is not critical and atmospheric, sub- or super atmospheric pressures may be employed. For convenience, atmospheric pressures are preferred.

The time of reaction is not critical, although to ensure complete reaction in step (a), a minimum of 6 hours is generally employed.

By titrimetric techniques, it has been found that the products of step (a) contain reactive epoxy groups.

It is preferred, for maximization of adhesive properties, to obtain compositions comprising 25 to 95 parts by weight of the amino ester modified vinyl polymer and 5 to 75 parts of by weight of the epoxy compound.

The adhesives of this invention are particularly useful in adhering polyvinyl fluoride film to a variety of substrates, having the advantage of reduced exposure to the irritating epoxy compound.

Examples of substrates which can be used in the laminates of this invention are metal substrates such as those of iron, steel, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite;" cement-asbestos boards; wood substrates such as those of birch, oak, fir, pine, hemlock, cedar, redwood, poplar, and ash; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetate. Composite substrates such as plywood or fabrics which are coated, impregnated or both, are particularly useful. Prior to lamination, metallic substrates can and usually are given a conventional passivation or corrosion-inhibiting treatment such as that used commercially to prepare substrates for painting. Substrates comprising metals, cementitious materials, wood and other cellulosic materials, sheets and films of vinyl chloride polymer and fabrics coated or coated and impregnated especially with vinyl chloride polymer are particularly preferred. Of course, a second layer of polyvinyl fluoride can also be used as a substrate.

The adhesives of the invention are particularly valuable in the case of laminates of polyvinyl fluoride film to rigid substrates such as metals or plastics, where the additional advantage of greater resistance to delamination of shaped articles is realized. However, the adhesives may be used for adhering any two of the above-listed substrates to one another.

Laminates of this invention are preferably prepared by continuously coating the aforementioned adhesive composition on one or both surfaces of each pair of surfaces to be adhered, drying the adhesive at a temperature of 25 to 250° C. to remove most of the solvent, then the surfaces to be adhered are brought together and the laminate pressed briefly at a pressure of 20 to 500 lbs./in.$^2$, and finally the laminate is stored for a period of 0.01 second to several days at a temperature of 20 to 100° C. to allow complete curing of the epoxyaminoester vinyl polymer adhesive. For example, with the preferred adhesives, a web of aluminum foil and a web of polyvinyl fluoride film can be laminated continuously at a speed of about 125 ft./min. by applying a thin layer of the adhesive composition of this invention to the surface of the aluminum foil by the use of an applicator roll, drying the adhesive by exposing the aluminum foil briefly to a blast of hot air at about 35° C.; bringing the aluminum foil and polyvinyl fluoride film together and passing them through a pair of spring loaded nip rolls adjusted to apply 150 lbs./in.$^2$ pressure; then the resulting laminate is collected in the form of a roll and allowed to cure for 10 minutes to 1 day while in storage under normal atmospheric conditions.

The surface of the polyvinyl fluoride film must be chemically activated, i.e., made receptive to lamination by forming in the surface layer thereof functional groups comprising, e.g. hydroxyl, carboxy, carbonyl, amino, amido, and ethylenically unsaturated groups. The preparation of the polyvinyl fluoride film is described in the aforementioned application Ser. No. 218,102 and the description therein pertaining to such preparation is hereby incorporated by reference.

If desired, pigments, corrosion inhibitors or ultraviolet light absorbers such as $TiO_2$, calcium molybdate, carbon black or basic zinc chromate can be incorporated into the adhesive at any stage of the process to improve the weathering properties of the laminated structures or to improve their appearance to impart some other desirable property. Incorporating an antioxidant or ultraviolet light absorber compound into the adhesive layer is especially desirable where clear polyvinyl fluoride film is laminated to plywood.

A curing agent is not necessary, but if it is desirable to accelerate the curing rate, an amine curing agent may be incorporated.

The preferred amine curing agents for use in the adhesive mixture of this invention are the polyalkylenepolyamines, such as formed from ethylenediamine, diethylenetriamine, triethylenetetraamine, etc. However, the particular type of the polyamines is, in general, not critical. In fact, the aminoester modified vinyl polymer, contained in the adhesive mixtures of this invention, are themselves polyamines and function as curing agents, and in certain instances satisfactory curing rates are achieved without including another polyamine curing agent in the adhesive solution. In general, the amount of polyamine curing agent needed in the adhesive mixture will depend upon the drying temperature and the speed at which a particular lamination process is to be conducted. Other polyamine curing agents which are commercially available and can be used include: diethylaminopropylamine, metaphenylenediamine, diaminodiphenylsulfone and methane diamine.

that the volatility of the epoxy component has been significantly decreased.

TABLE I

| Example | Parts of amino ester modified vinyl polymer | Epoxy oxygen/amino hydrogen ratio | Solvents (parts) | | Relative viscosity of solution after step (a) | Percent volatile at 200° C. | | |
|---|---|---|---|---|---|---|---|---|
| | | | Toluene | Isopropyl alcohol | | 1 min. | 2 min. | 5 min. |
| Control | 0 | ± | 289 | 0 | 2.3207 | 34.3 | 38.3 | 38.5 |
| 1 | 8.4 | 15 | 306 | 7 | 6.327 | 5.80 | 8.10 | 15.20 |
| 2 | 17.9 | 7.06 | 325 | 15 | 28.2308 | 1.22 | 2.46 | 7.85 |
| 3 | 35.1 | 3.6 | 359 | 30 | (¹) | 0.56 | 2.50 | 7.85 |
| 4 | 72.2 | 1.75 | 433 | 62 | (²) | 0.00 | 1.88 | 7.55 |
| 5 | 148.6 | 0.85 | 587 | 127 | (³) | 0.00 | 1.49 | 5.88 |

¹ Slight gel on cooling.   ² Gel on cooling.   ³ Gel when hot.

The laminate products of this invention because of their excellent combination of weather resistance, abrasion resistance, solvent resistance, formability and excellent interlayer adhesion find ready use in many fields. In the construction field, both pigmented and clear polyvinyl fluoride films can be laminated to such substrates as cold rolled steel, galvanized and/or aluminized steel, aluminum plywood, hardboards such as "Masonite," cement-asbestos boards and asphalt-impregnated cellulosic boards for use as siding and/or roofing for houses and other domestic structures as well as for commercial, industrial and institutional buildings. Laminations to metal and wooden substrates can be employed in the manufacture of outdoor signs, wall tile, wall and ceiling paneling, venetian blinds, interior partitioning, awnings, ductwork, counter- and table-tops, store fronts, rain gutters and downspouts. Laminations to metal, particularly of pigmented polyvinyl fluoride films, can be post-formed and employed to replace enameled and baked wall, ceiling, floor and side members of appliances such as refrigerators, freezers, air conditioners, dehumidifiers, hot-water heaters, washers and dryers, kitchen cupboards and cabinets. In the automotive field, laminations of clear, metallized and pigmented polyvinyl fluoride films to metal substrates can be employed variously as automobile door and side paneling, hard tops, moldings, interior and exterior trim, instrument paneling, wheel covers and hub caps, siding and tops for house trailers and truck and van bodies. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings.

The invention can be better understood by referring to the following examples, in which all parts and percentages are expressed by weight unless otherwise stated.

Examples 1–5

A mixture of 101 parts of the diglycidyl ether of resorcinol (theoretical epoxy equivalent 95; actual epoxy equivalent 128, as measured by titration) and various amounts (as shown in Table I) of an amino ester modified vinyl polymer (9/45.7/35.3/10 butyl acrylate/butyl methacrylate/methyl methacrylate/methacrylic acid, post-reacted with propylenimine) having an amino hydrogen equivalent of 160 in sufficient toluene/isopropanol solvent to give a 35% solids solution was heated under reflux for 24 hours. The epoxy oxygen/amino hydrogen ratio and viscosity of the resulting solutions are shown in Table I. The solvent was removed from the several solutions under vacuum. The volatility of the remaining mixtures was determined as percent weight loss for various time intervals at 200° C., a typical temperature employed in laminating operations, and compared with a control containing no amino ester modified vinyl polymer. It is evident Example 6

The product of Example 1 (having an epoxy oxygen/amino hydrogen ratio of 15) was tested on guinea pigs as a primary irritant and as an allergenic, compared with the diglycidyl ether of resorcinol as a control. As a primary irritant, while the unreacted epoxy compound was highly irritating when applied as a 10% solution, giving a strong reaction of edema and redness in 100% of the animals tested, the product of Example 1 produced reactions on only 80% of the animals tested, these reactions being very mild irritations. As an allergenic, while the unreacted epoxy compound was a strong sensitizer causing edema and drainage, producing severe reactions in 100% of the animals tested, the product of Example 1 was a mild allergenic, producing sensitized mild reactions on only 40% of the animals tested.

Example 7

The product of Example 1 (formed by reaction of 101 parts of diglycidyl ether of resorcinol and 8.4 parts of the amino ester modified vinyl polymer in 212 parts of toluene and 7 parts of isopropyl alcohol), 665.6 parts of the same amino ester modified vinyl polymer, 30 parts of carbon black, 195 parts of calcium molybdate, 1210 parts of toluene, and 571 parts of isopropyl alcohol were thoroughly mixed together.

A control adhesive was prepared mixing together 101 parts of the diglycidyl ether of resorcinol, 674 parts of the same amino ester modified vinyl polymer, 30 parts of carbon black, 195 parts of calcium molybdate, 1422 parts of toluene, and 578 parts of isopropyl alcohol. The test and control adhesives of this example were thus prepared from the same amounts of various components and differ only in the manner of preparation.

Laminates of polyvinyl fluoride film to galvanized steel panels were prepared with each of these adhesives as follows.

Each of a series of 6-inch by 12-inch galvanized steel panels, 23 mils thick and passviated with a complex phosphate coating (Bonderite 37S, a proprietary of Parker Rustproof Co., Detroit, Mich.) is coated on one side with a 1.5 mil (approx.) thick wet layer of a solution of the adhesive to be tested. The adhesive is applied from a 35% (approx.) solution in a mixed solvent consisting of about 30% isopropanol and 70% toluene. Each thus coated panel is allowed to air dry at room temperature for about 10 minutes during which the bulk of the solvent is volatilized from the adhesive layer. The dry adhesive layer is thus ca. 0.5 mil thick. Then each of the panels is placed in a circulating hot air oven, the oven being maintained at a temperature in the range of 150° C. to 230° C. After a length of time (usually between 45 seconds and one minute) sufficient to bring each panel and adhesive layer up to the oven temperature, each panel is removed from its respective oven and combined with the treated polyvinyl fluoride film by passing the panel lengthwise through a combining nip consisting of two rubber-covered rolls rotating at a nip speed of 100 lineal ft./min. and applying a pressure to the lamination of about 85–90 p.s.i. The temperature is instantaneously measured at the time of lamination by means of a thermocouple which is attached to the metal panel, and which thus passes through the nip rolls along with the panel, the temperature being recorded with a Sanborn high speed recorder capable of detecting a temperature within a time period of 0.0001 sec. A 4-inch by 6-inch piece is cut from one end of each lamination, and four dimples (located at the corners of a 2-inch by 3-inch rectangle centered in the 4-inch by 6-inch panel) are pressed into the lamination from the steel side (i.e., the polyvinyl fluoride film is outermost on the convex side of each dimple) in a die using ¾-inch diameter steel balls under a load which gives the maximum depth of dimple without metal fracture. This depth averages about ½ to ⅝ of an inch. Starting at the top center of each dimple of each panel, two parallel cuts 1/16-inch apart are made in the film with a No. 10 Exacto Knife blade, the cuts penetrating through to the steel substrate and extending down the dimple to the inflection boundary between the dimple and the flat portion of the panel. A No. 10 Exacto Knife blade is then used in an attempt to pry up the film strip at its approximate midpoint. If the film strip can be lifted, tweezers are used in an attempt to peel it back. The results are rated as follows:

| Dimple rating: | Explanation |
|---|---|
| 5 | Cannot lift film or start peel. |
| 3 | Film strip can be lifted and peeled from the dimple over a distance of about half of the cut length of the strip. |
| 0 | Film strip can be lifted and peeled from the dimple past the inflection boundary where the dimple joins the flat surface. |

Intermediate ratings are given by interpolation between those indicated above. The ratings of the four dimples are averaged to give an "initial dimple peel."

A second 4-inch by 6-inch piece of the laminated panel is prepared with four dimples as above, and again, two parallel cuts 1/16-inch apart are made in each dimple as above. The panel is placed in boiling water for five minutes, cooled to room temperature in water, and if the film strip can be lifted it is peeled and rated on the above scale. The ratings of the four dimples are averaged to give a "boiled dimple peel."

The results of the test, which are summarized in Table II, show that the adhesive prepared by the process of this invention gives bonds superior to those of the control adhesive.

TABLE II

| Adhesive | Laminating Temperature, °C. | Initial Dimple Peel | Boiled Dimple Peel |
|---|---|---|---|
| Ex. 7 | 147 | 2 | 4 |
|  | 166 | 2 | 4.5 |
|  | 182 | 2.5 | 4.5 |
|  | 184 | 3.5 | 4.5 |
|  | 190 | 3.5 | 4.5 |
|  | 195 | 3.5 | 5 |
|  | 196 | 4 | 5 |
|  | 201 | 3.5 | 5 |
|  | 205 | 3.5 | 4.5 |
|  | 210 | 2.5 | 4.5 |
| Control | 147 | 2 | 2 |
|  | 166 | 2 | 2 |
|  | 182 | 2.5 | 2.5 |
|  | 195 | 2.5 | 2.5 |
|  | 200 | 2.5 | 2.5 |
|  | 210 | 2 | 2 |

The amino ester modified vinyl polymers operable in this invention and their preparations are described in the aforementioned application Ser. No. 218,102. The composition of the bulk of the vinyl polymer is not critical. The epoxy compounds operable in this invention and their preparation are also described in the afore-mentioned application. Applicable portions of the aforesaid application Ser. No. 218,102 are herein incorporated by reference.

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. The process for preparing a composition comprising (1) $W_v$ parts by weight of an amino ester modified vinyl polymer having attached to the carbon-carbon chain monovalent groups of the formula

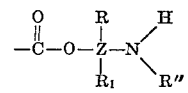

wherein Z is an aliphatic hydrocarbon radical of 2 through 3 carbons; R is selected from the group consisting of hydrogen and alkyl of 1 through 8 carbons; R' is selected from the group consisting of hydrogen, hydroxy and alkyl of 1 through 8 carbons; and R'' is selected from the group consisting of hydrogen, non-tertiary alkyl of 1 through 8 carbons, and omega-hydroxy non-tertiary alkyl of 1 through 8 carbons; and (2) $W_e$ parts by weight of an epoxy compound having 2 through 5 epoxy groups, wherein $W_v$ represents 5 to 97 parts by weight of said polymer, $W_e$ represents 3 to 95 parts by weight of said epoxy compound, $W_v + W_e$ selected to equal 100 parts by weight, which comprises (a) mixing, for at least 6 hours and at a temperature of at least 50° C., $W_e$ parts of said compound with $Y$ parts of said polymer, $Y$ being less than $W_v$ and selected such that the value $$\frac{W_e E_h}{E_e Y}$$

is between about 1 and 20, wherein $E_h$ is the amino hydrogen equivalent of said polymer and $E_e$ is the epoxide equivalent of said epoxy compound, and (b) mixing the product of step (a) with $W_v - Y$ parts of said polymer.

2. The process of claim 1 carried out in the presence of an inert organic solvent.

3. The process of claim 1 wherein the vinyl polymer is derived from an acrylic ester of a lower aliphatic alcohol having a primary-amino-substituted ester group selected from the class consisting of

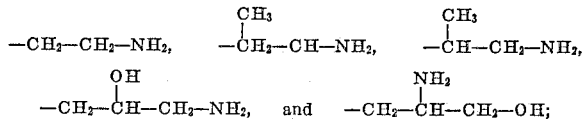

and wherein the epoxy compound is a polyglycidyl ether of a dihydric phenolic compound.

4. The process of claim 3 wherein the epoxy compound is the diglycidyl ether of resorcinol.

5. The process of claim 1 wherein $W_v$ is between 25 to 95 parts by weight of said polymer and $W_e$ is between 5 to 75 parts by weight of said epoxy compound.

6. An adhesive composition comprising the reaction product of claim 1.

7. An adhesive composition comprising the reaction product of claim 3.

8. An adhesive composition comprising the reaction product of claim 4.

9. A laminated structure comprising: a substrate, a preformed layer of polyvinylfluoride film, one surface of which has been chemically activated, and, between said substrate and said activated surface, a layer of an adhesive comprising the reaction product of claim 1.

References Cited

UNITED STATES PATENTS 3,228,823  1/1966  Wolinski et al. _____ 260—837

MURRAY TILLMAN, *Primary Examiner.*

P. LIEBERMAN, *Assistant Examiner.*